United States Patent [19]
Mettler

[11] 3,938,276

[45] Feb. 17, 1976

[54] QUICK-LOCK FISH BAG

[76] Inventor: Charles W. Mettler, 1120 7th Ave. S., South St. Paul, Minn. 55075

[22] Filed: Apr. 28, 1975

[21] Appl. No.: 572,408

[52] U.S. Cl. ................................................. 43/55
[51] Int. Cl.² ...................................... A01K 97/04
[58] Field of Search ............. 43/55, 11, 12, 56, 54.5

[56] References Cited
UNITED STATES PATENTS

| | | | |
|---|---|---|---|
| 1,351,628 | 8/1920 | Dukas | 43/12 |
| 2,493,203 | 1/1950 | Madeksho | 43/55 |
| 2,591,891 | 4/1952 | Thorsen | 43/55 |
| 3,660,925 | 5/1972 | Miller | 43/55 |

Primary Examiner—Warner H. Camp

[57] ABSTRACT

A fishing bag in the form of a woven net suspended at its open mouth end from a circular ring by means of S-shaped hooks and having a winged V-shaped bracket affixed to the ring and extending radially outwardly therefrom with its vertex affixed to a post extending normal to the plane of the ring and adapted to be readily fit into an oarlock hole of a fishing boat for securing the fishing bag to the boat in a manner suspended over a side of the boat with the net emersed in the water to retain fish that have been caught by the fishermen in a fresh manner.

1 Claim, 3 Drawing Figures

U.S. Patent  Feb 17, 1976  3,938,276
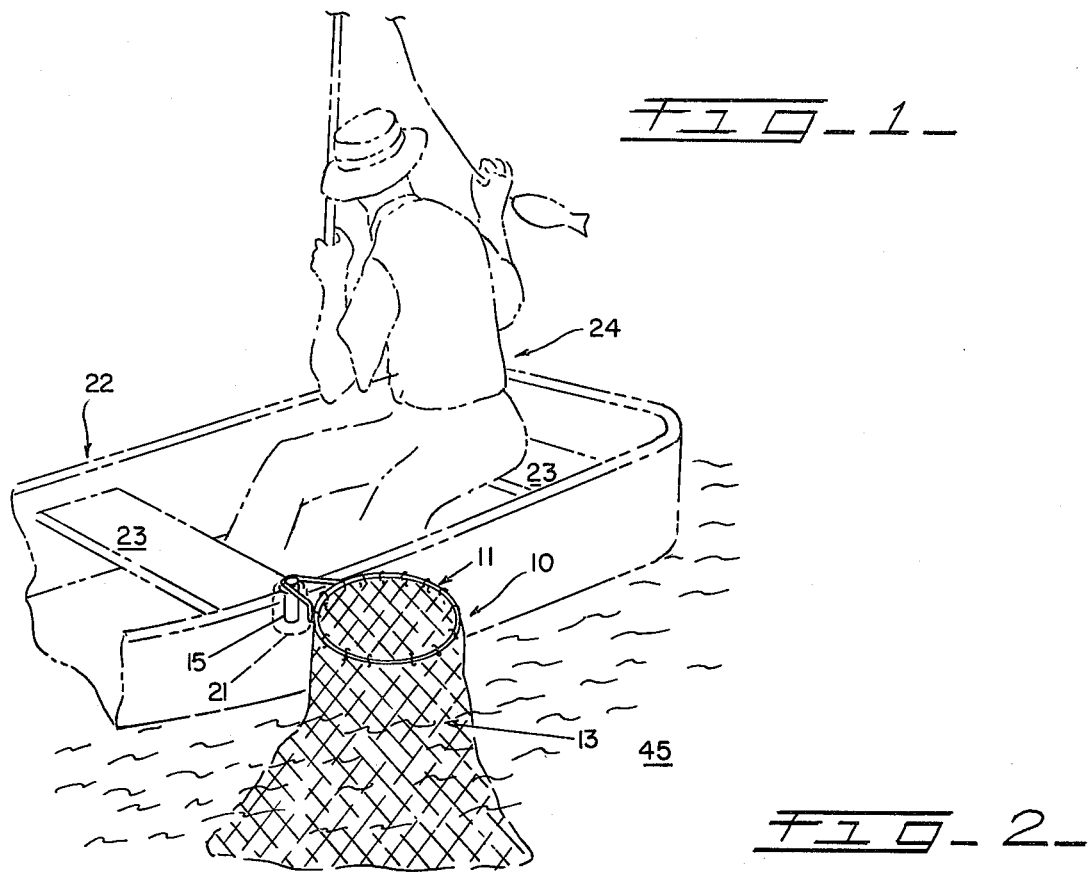
FIG_1_
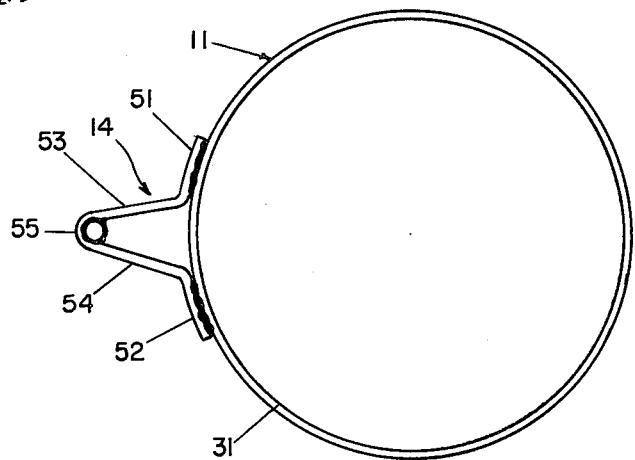
FIG_2_
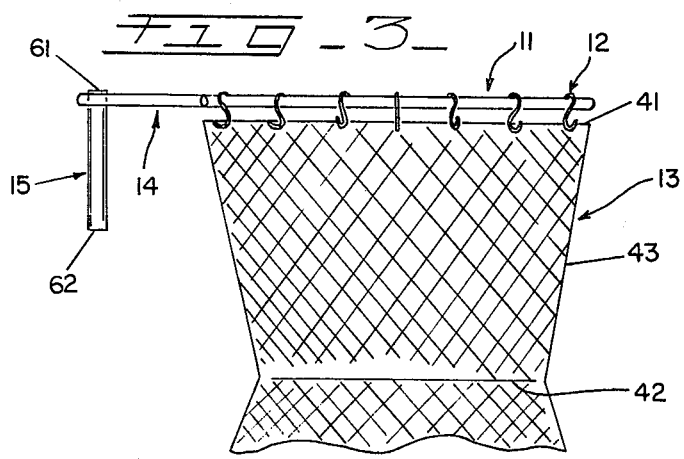
FIG_3_

QUICK-LOCK FISH BAG

BACKGROUND OF THE INVENTION

1. Field of the Invention

This invention relates generally to fishing accessories and more particularly to a novel and improved quick-lock fish bag which may be readily mountably affixed to an oarlock hole of a boat with the net of the bag suspended over the side of the boat and emersed in the water to retain fish caught by the fishermen therein in a fresh manner.

2. Description of the Prior Art

It has been known in the prior art to provide clamp-on type fish baskets invented for use by fishermen by being clamped onto the gunwhale of a boat, the clamp-on baskets being difficult to attach to the boat with the clamp having a tendency to bend or break while also tending to mar the finish of the boat.

It would thus be desirable to provide a fish bag which could be readily attached to and detached from the boat for ease of usage thereof by a fisherman.

SUMMARY OF THE INVENTION

The present invention recognizes the deficiencies and disadvantages of presently available fish bags or baskets and provides a novel solution thereto in the form of a quick-lock fish bag including a post readily received in an oarlock hole of a fishing boat with the net of the basket being suspended over the side of the boat and emersed in the water for the keeping of fish therein, the bag being readily mounted onto and demounted from the fishing boat.

It is a feature of the present invention to provide a quick-lock fish bag.

A further feature of the present invention provides a quick-lock fish bag which is relatively simple in its construction and which, therefore, may be readily manufactured at a relatively low cost and by simple manufacturing methods so that it can be retailed at a sufficiently low price to encourage widespread use and purchase thereof.

Still a further feature of the present invention provides a quick-lock fish bag which is possessed of few parts and which, therefore, is unlikely to get out of order so that it is of a rugged and durable construction and which, therefore, can be guaranteed by the manufacturer to withstand many years of intended usage.

Still a further feature of the present invention provides a quick-lock fish bag which is easy to use and reliable and efficient in operation and which may be readily mounted onto and demounted from a boat without the need of any special skills, expertise, or tools.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of the quick-lock fish bag of the invention illustrated mounted on the side of a fishing boat;

FIG. 2 is a top view of the invention with the net removed therefrom; and

FIG. 3 is a side elevational view of the invention.

DESCRIPTION OF THE PREFERRED EMBODIMENT

Referring now to the drawings in detail, there is illustrated a preferred form of a quick-lock fish bag constructed in accordance with the principles of the present invention and which is designated generally in its entirety by the reference numeral 10, the fish bag being comprised of a ring 11, S-hooks 12 supporting a net 13, a bracket 14, and a post 15 which is adapted to be vertically inserted into an oarlock hole 21 of a typical fishing boat 22, having seats 23 for the comfort of a fisherman 24.

The ring 11 is of an endless circular type as to body member 31 which has a generally circular cross-sectional configuration. The ring 11 may be manufactured out of metal, wood, hard rubber, plastic, or any other suitable satisfactory material with the preferred embodiment being manufactured of metal treated for corrosion resistance and utilized for its inherent strength.

A multitude of the S-hooks are suspended on the ring body member 31 and extend downwardly therefrom to have affixed thereto the mouth end 41 of net 13 with the net being manufactured of woven wire having a closed bottom end 42 and sidewalls 43 for retaining fish therein, the net being of a sufficient length to be emersed in water 45 when bag 10 is suspended from fishing boat 22.

Affixed to an exterior portion of ring body member 31 is the mounting bracket 14 which is formed of an elongated cylindrical rod bent into a winged V-shaped configuration and defined by wings 51 and 52 which are welded to body member 31, legs 53 and 54 which extend outwardly therefrom, and a vertex 55 which extends furthest from body member 31 and generally radial relative thereto. The bracket 14 lies co-planar with ring 11.

The post 15 is of an elongated cylindrical configuration having its top end 61 pass through the inner portion of vertex 55 of bracket 14 and secured permanently thereto by welding, its bottom end 62 extending vertically downwardly therefrom and normal to the plane of the ring 11 and adapted to be readily inserted into oarlock hole 21.

In operation, fisherman 24 merely inserts post 15 into oarlock hole 21 with net 13 projecting outwardly of the side of the boat and emersed in water 45 for retaining fish therein that have been caught by the fisherman. On docking of the boat, the fisherman need only grip the post 15 and bracket portion 14 in a handle like manner for the carrying of the bag 10 between different locations.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A fish bag intended for use with an oarlock hole of a fishing boat, the bag comprising, in combination:

a ring member of an elongated continuous endless band having a circular cross-sectional configuration;

a plurality of S-hooks suspended from the ring member and extending downwardly therefrom;

a net having its open mouth end suspended from the S-hooks completely about the ring the net being manufactured of woven wire having an open mouth end, a closed bottom end, and side wall surfaces, the open mouth end being suspended generally parallel to the plane of the ring and spaced slightly downwardly therefrom by the S-shaped hook;

a bracket affixed to the ring and extending radially outward therefrom, the bracket being of a winged V-shaped configuration having the wings permanently affixed to the ring and with the vertex of the V projecting radially outwardly from the ring, the bracket lying coplanar with the plane of the ring and having its vertex end extending furthest outwardly from the periphery of the ring; and a cylindrical post affixed to the bracket and extending downwardly therefrom in a direction normal to the plane of the ring and adapted to be fit into the oarlock hole of a boat for securing the bag thereto, the post being of an elongated cylindrical configuration having a top end and a bottom end and cylindrical side walls, the top end of the post being positioned inwardly of the vertex portion of the bracket and being permanently affixed thereto with the post extending normal to the bracket in the same direction in which the net is suspended from the ring.

* * * * *